2,943,110

ALPHA-NAPHTHYL UREIDE OF 3-AMINO-2,2-DI-METHYL CYCLOBUTANEACETIC ACID AND METHOD FOR ITS PREPARATION

Glen W. Hedrick, Lake City, Fla., assignor to the United States of America as represented by the Secretary of Agriculture No Drawing. Original application May 6, 1957, Ser. No. 657,458. Divided and this application Jan. 27, 1959, Ser. No. 791,510

2 Claims. (Cl. 260—553)

(Granted under Title 35, U.S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to novel amino acids containing a cyclobutane ring and certain derivatives thereof. More particularly it relates to the preparation of 3-amino-2,2,-dimethyl-cyclobutaneacetic acid from pinonic acid, and to certain polymeric derivatives thereof, as well as the N-acetyl amide, and to certain esters, and salts, as hereinafter described.

It has been discovered that pinonic acid, or one of its esters, can be reacted with hydrazoic acid in an inert solvent, using sulfuric acid as a catalyst, to yield a mixture of amides. As an illustration, pinonic acid (I) reacts with hydrazoic acid to yield a mixture of 3-acetylamino-2,2-dimethylcyclobutaneacetic acid (II) and the N-methylamide of pinic acid (III) according to the following reaction:

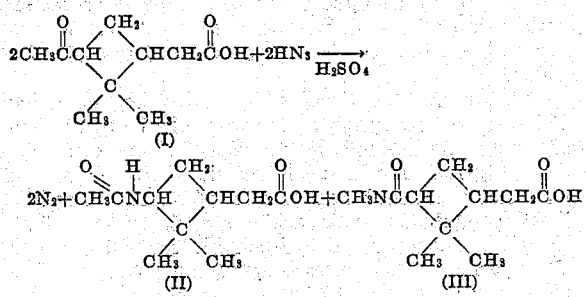

If the corresponding ester of I, such as, for example, the ethyl ester, is used as the starting material, the corresponding ethyl esters of II and III are obtained.

In the above reaction, product II predominates to the extent of about 90%.

Pinonic acid (I) is a keto-acid obtained by the permanganate oxidation of α-pinene or by ozonolysis of α-pinene.

Upon hydrolysis with a strong mineral acid, the acetylamino compound (II) yields 3-amino-2,2-dimethyl-cyclobutaneacid acid,

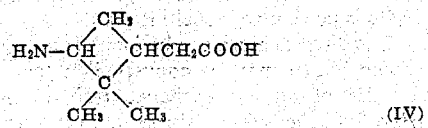

More particularly, the product of the reaction of pinonic acid or its ethyl ester with hydrazoic acid is a mixture of amides, as can be seen from the above equation. Alkaline hydrolysis yields a small amount of methylamine characterized by the p-nitrobenzoyl derivative. Acid hydrolysis results in an appreciable quantity of acetic acid characterized by acetanilide. The amounts of these two obtained from the reaction product establishes that 88 to 90% of the acetyl amino compound is present and that 10 to 12% of the N-methylamide of pinic acid is formed simultaneously. These results are confirmed by elemental analyses, molecular refraction and saponification numbers. The presence of pinic acid was confirmed by isolating it from the ether extract after acid hydrolysis. Removal of ether and distilling in vacuo, B.P. 185–195° C./1 mm., the distillate was proven to be pinic acid by preparing the di(dicyclohexylamine) salt (M.P. 152–154° C., authentic sample 152.6–153.8°, mixed M.P. 152–54° C.). The main product of the reaction is the acetyl derivative of 3-amino-2,2-dimethylcyclobutaneacetic acid (the ethyl ester if the ester was used). The desired product can be obtained by acid hydrolysis and isolated as the salt or as the free amino acid either from the neutralized mass or by use of an ion exchange resin. The product is an almost colorless solid which was characterized by the neutral equivalent and elemental analyses of its α-naphthyl ureide, M.P. 188–9° C. The hydrochloride of the amino acid is readily prepared, M.P. 167.4–168.2° C.

Compound IV, above, as well as its simple esters, are valuable intermediates for the production of polyamide polymers and resins, as well as for the production of surface-active materials having wetting, detergent, emulsifying, and foaming properties, and also for the production of compounds having textile lubricating and softening properties.

In the preferred procedure, a hydrazoic acid solution in chloroform is prepared by adding a slight excess of concentrated sulfuric acid to aqueous sodium azide dispersed in the solvent. The solution is decanted from the aqueous salt layer and dried over sodium sulfate. The ketone, either pinonic acid or its ester, is then dissolved in this mixture and slowly added to an agitated mixture of concentrated sulfuric acid in chloroform maintained at 0° to 5° C. During the reaction nitrogen is continuously evolved. When evolution of gas ceases the mass is poured onto ice and water. This can be heated to effect hydrolysis in situ, or it can be neutralized and the product isolated by extraction with chloroform.

If isolation by hydrolysis in situ is desired, the mass is heated to reflux, simultaneously removing the solvent azeotropically. The acetic acid can be removed at this point by distilling and steaming until the distillate is neutral. After a few hours of refluxing, hydrolysis is complete and the mixture is cooled and extracted with chloroform or ether until all the pinic acid is removed. The acid aqueous phase contains the amino acid and methylamine as sulfuric acid salts. These can be neutralized with caustic soda; and either the free amine or the sulfate, depending upon the extent of neutralization, can be obtained by alcohol extraction of the dried mass. To avoid extraction, it is preferred that barium or calcium carbonates or hydroxides be used. By careful neutralization either the sulfate or the free amine can be obtained. It is possible also to obtain the free amine by a partial neutralization with calcium or barium carbonates or hydroxides, filtering to remove the insoluble sulfates, and then passing the filtrate over an ion exchange resin, such as Amberlite IR–4B, manufactured by the Resinous Products Company, Rohm and Haas Company, Philadelphia, Pennsylvania. Amberlite IR–4B is a weakly basic phenol formaldehyde-type anion exchanger. The clear effluent is a water solution containing a mixture of methylamine and 3-amino-2,2-dimethylcyclobutane acetic acid. During evaporation of the water the methylamine distills, leaving behind the amino acid.

Instead of isolation by hydrolysis in situ and subsequent extraction, the product (acetylamino compound), can be isolated by evaporation of the chloroform. The acetamino compound, when pinonic acid is used, is a viscous liquid monobasic acid which, through acid interchange, yields acetic acid and polymerizes giving a hard resin when heated to above 160° C. for distillation purposes. It may be characterized by converting to the p-bromophenacyl ester or the dicyclohexylamine salt.

The acetylamino compound obtained from ethyl pinonate is a liquid, B.P. 139°/0.5 mm., $n_D^{20}$=1.4687, $D^{20}$=1.042, $M_D$=60.9, $M_D$ theoretical=61.110. The free amine can be prepared by hydrolysis discussed above.

In addition to the above, the following examples will further illustrate the invention.

*Example 1.—Reaction of ethyl pinonate*

A chloroform solution of hydrazoic acid was first prepared by adding 35 cc. concentrated sulfuric acid to an agitated mixture of 80 g. sodium azide and 80 cc. water in 515 cc. chloroform held at 0° C. The solution was decanted from the thick, almost solid, aqueous phase containing the excess acid and sodium sulfate and then dried over sodium sulfate. The amount of hydrazoic acid in solution was determined by titration with standard caustic. 175 grams of ethyl pinonate, which represented one equivalent weight based on the amount of hydrazoic acid, were then added to this solution.

The solution containing the ethyl pinonate and hydrazoic acid was then added over a 2 to 3 hour period to an agitated mixture of 273 cc. concentrated sulfuric acid and 500 cc. chloroform maintained at 0.5° C. From the start of the addition nitrogen was evolved. After addition of the ester and gas evolution ceased the mixture, light amber in color, was poured onto ice and was isolated in the manner described above. The yield of distilled product from 175 g. ester is 140 g. or 75.5% yield.

*Example 2.—Reaction with pinonic acid*

(a) 162 grams of pinonic acid were dissolved in a chloroform solution of hydrazoic acid and added to sulfuric acid as in Example 1. Isolation of the product by neutralization with sodium hydroxide to a pH of about three, separating the chloroform layer, and evaporating the chloroform resulted in a thick, almost colorless, syrup containing some chloroform and water. The yield was 256 gms. of crude amino acid. Titration of a sample by standard caustic solution and removal of volatiles by evaporation indicated the mix contained 48 to 49% amino acid, or about 70% of the theoretical yield.

The product was characterized by the dicyclohexylamine salt 2(b) below, and the p-bromophenacyl ester, 2(c) below.

(b) Dicyclohexylamine salt. 4 gms. of dicyclohexylamine in about 50 cc. ethyl alcohol were added to 10 gms. of the crude mixture as obtained in 2(a) above. This was warmed and diluted with an equal volume of acetone. A colorless crystalline mass precipitated which was isolated after cooling by filtration. The yield of crude product was almost quantitative, M.P. 192-4° C. and consisted of a mixture of salts of 3-acetylamino-2,2-dimethyl cyclobutaneacetic acid and N-methylamide of pinic acid. A small amount of material was obtained by concentration of the filtrate.

Repeated recrystallization of the fractions from a 50% chloroform acetone mixture gave two products. The first and larger fraction melted at 194.4–195.6° C. which, by mixed melting point was identical to the salt prepared from the free amino acid. The smaller fraction after purifying melted at 164.5 to 166° C. and was undoubtedly the salt of N-methylamide of pinic acid.

(c) The hexylamine salt was difficult to purify by crystallization. Consequently, the p-bromophenacyl ester was prepared (Identification of Organic Compounds, Shriner and Fuson, pg. 132, Second Edition). From 2.79 gms. p-bromophenacyl bromide and 5 g. of material prepared in 2(a) above, 2.7 gms. colorless crude ester was obtained, M.P. 162–163.5° C. Recrystallization once from 60% alcohol and once from 95% alcohol yielded a product melting at 166–166.8° C. This was identical to a product obtained by acetylation and esterification of the amino acid.

*Example 3.—Preparation of 3-amino-2,2-dimethylcyclobutane acetic acid*

Either the ester from Example 1 or product from Example 2 may be used for preparation of the amino acid.

(a) Sulfuric acid hydrolysis. Fifty grams pure ester or an equivalent amount of 3-acetylamino-2,3-dimethylcyclobutaneacetic acid were placed in a flask containing about 200 cc. 3 N sulfuric acid and refluxed overnight. This was set up for continuous extraction with ether over a 16 to 24 hour period. After extraction the pinic acid and acetic acid could be isolated from the ether extract. In the case of the ester most of the acetic acid appeared as ethyl acetate. The aqueous phase was exactly neutralized with barium hydroxide or barium carbonate in order to remove all the sulfate ion by filtration from solution. The free amino acid was concentrated to 30 to 50% solids in the filtrate by evaporation of the water. The product crystallized from the concentrate as a colorless solid; presumably an inner salt. Since the acid is quite soluble in water and insoluble in acetone it was found desirable to dilute the concentrated mix with acetone from which the product was isolated.

During the evaporation of the water most of the methyl amine escaped as the free base. However, at no time was the solution completely free of this material. Evaporation of the filtrate to remove the water and acetone resulted in a small amount of material (1.2 gms. from 50 gms. ester) which was believed to be the methylamine salt of a geometric isomer of amino cyclobutaneacetic acid (p-bromophenacyl ester of acetylamino cyclobutaneacetic acid, M.P. 113–114° C.).

By neutralizing with sufficient barium salt to neutralize the free sulfuric acid and following the above procedure a white crystalline salt was obtained which was a mixture of the sulfate of the amino acid and methylamine sulfate.

By neutralizing with sodium hydroxide the free amino acid was isolated by drying the neutralized mixture and extracting from the sodium sulfate with absolute alcohol.

(b) Hydrochloric acid hydrolysis. Fifty grams of pure ester or an equivalent amount of 3-acetylamino-2,2-dimethylcyclobutaneacetic acid were placed in a flask with 45 cc. concentrated hydrochloric acid diluted with 150 cc. water. This was refluxed 16 hours then extracted with ether as in 3(a) above. The ether layer was removed and the aqueous phase concentrated in vacuo. Towards the end, colorless, hygroscopic crystals of the hydrochloride of 3-amino-2,2-dimethylcyclobutaneacetic acid appeared. Although the product could be isolated by filtration at this point it was found advantageous to dilute with acetone. The salt is almost completely insoluble in acetone and consequently can be isolated readily and qunatitatively, while at the same time excess hydrochloric acid and methylamine hydrochloride are removed. The melting point when dry is 167.6 to 168.6° C. If redissolved in water and reprecipitated by acetone there is no change in melting point.

The hydrochloride obtained from concentration in vacuo above may be converted to the free amino acid by use of an ion exchange resin already referred to. For this, the salt is dissolved in 1 liter distilled water and added dropwise to a previously prepared column 1½ x 30 inches of Amberlite IR-4B resin. Afterwards, the column is flushed with 2 liters distilled water. The combined clear yellow effluent, and wash, are evaporated to 50 to 100 cc. from which the free amino acid may be isolated as above. The yield is 71%.

Example 4.—Preparation of the hydrochloride from the free amino acid

The free amino acid (3.14 gms.) was dissolved in 2 cc. concentrated hydrochloric acid by heating on the steam bath. On cooling a heavy mass of colorless crystals appeared. The entire mass was diluted with about 50 cc. acetone, cooled and filtered. The first crop of crystals was dried over concentrated sulfuric acid in a vacuum desiccator (2.07 gms., 53.5% yield, M.P. 167.6 to 168.6° C.). Concentration of the filtrate gave 1.5 gms. of a second crop of colorless crystals, M.P. 165.6–166.8° C. A mixed melting point with first crop gave no depression in melting point. One gram of the first fraction was recrystallized by dissolving in a small amount of water and reprecipitating with acetone, M.P. 167.4–168.2° C.

Example 5.—α-Naphthyl ureide of 3-amino-2,2-dimethyl cyclobutaneacetic acid

One equivalent of α-naphthylisocyanate was added to 3.14 gms, 0.02 mole, of the amino acid dissolved in about 20 cc. water containing sufficient alkali to maintain a pink color to phenolphthalein. The mixture was warmed and shaken until the isocyanate has completely reacted. Some di-α-naphthyl urea precipitated, and this was removed by filtration. The clear filtrate on acidification gave a colorless precipitate which crystallized well from 50 and 95 percent alcohol (melting point 183–4° C., neutral equivalent 326). The solid material obtained by acidification in the cold is a hydrate which liquefies if placed on a steam bath. The pure recrystallized material decomposes at the melting point, resolidifies and melts again at about 226° C. Cooling the final melt results in a hard, brittle resin as a result of polymerization.

Example 6.—3-acetylamino-2,2-dimethyl cyclobutaneacetic acid from the free amino acid (a) Three-hundredths mole, 4.71 gms., of the amino acid were dissolved in 20 cc. glacial acetic acid and refluxed overnight with 4 cc. acetic anhydride. The acetic acid and excess anhydride were removed by vacuum distillation. The residue was a thick viscous liquid which failed to crystallize.

A sample treated with nitrous acid gave a negative test for nitrogen. Another sample dissolved in a 50% alcohol-acetone mixture gave a colorless salt with dihexylamine (M.P. 194–5° C.). With p-bromophenacyl bromide an ester was obtained which melted at 166–166.8° C.

(b) To illustrate the polymerization tendencies the remainder of the compound was heated in vacuo to about 250° C. (still temperature). Only acetic acid distilled over which solidified in the Dry Ice trap in the vacuum system. After heating for about 2 hours the contents of the flask were poured into a beaker. When cold, the mass was clear, dark amber, and very brittle. It softened in hot alcohol and was largely insoluble in water, mineral acids and dilute alkali.

Example 7.—Polymerization of 3-amino-2,2-dimethyl cyclobutaneacetic acid (a) About 1 gm. of the amino acid was heated in an open test tube for a few minutes. Some of the material sublimed but most of the material liquified and polymerized by the elimination of water. The cold material was a dark amber resin much the same in appearance as that obtained in Example 6.

(b) ε-caprolactam was heated in a sealed test tube to 260° C. in an oil bath for 2 hours. After this period of heating the product was still completely soluble in water and alcohol.

(c) A mixture of ε-caprolactam and 5% of 3-amino-2,2-dimethyl cyclobutaneacetic acid was sealed in a test tube and heated as in (b) above. After two hours the material was cooled, giving an opaque, almost colorless hard resin which softened in alcohol but did not dissolve and was insoluble in water. In compositions prepared in a like manner containing 25, 50 and 90 percent 3-amino-2,2-dimethyl cyclobutaneactic acid with ε-caprolactam the resins obtained were clear instead of opaque and by visual observation the brittleness increased with decreased amounts of caprolactam.

Example 8.—Octyl ester of 3-amino-2,2-dimethyl cyclobutaneacetic acid hydrochloride A few grams of the hydrochloride of the amino acid were added to a flask containing toluene and an excess of n-octyl alcohol. This was heated for several hours. No water was removed, nor did the hydrochloride go into solution. About half the toluene was removed and replaced by o-dichlorobenzene. Refluxing overnight more than the theoretical amount of water was eliminated and the salt had become soluble. It was concluded that esterification had occurred.

The solvent was removed by steam distillation and the still residue concentrated by removal of water. The resulting solution containing about 10% of the hydrochloride of octyl 3-amino-2,2-dimethyl cyclobutaneacetate was of a soapy consistency. Dilute solutions had good wetting, dispersing, foaming and emulsifying properties.

This application is a division of Serial No. 657,458, filed May 6, 1957.

I claim:

1. The α-naphthyl ureide of 3-amino-2,2-dimethyl cyclobutaneacetic acid.

2. A process for preparing the alpha-naphthyl ureide of 3-amino-2,2-dimethyl cyclobutaneacetic acid which comprises mixing alpha-naphthylisocyanate with an equivalent amount of 3-amino-2,2-dimethyl cyclobutaneacetic acid dissolved in an aqueous alkali solution and recovering the so-produced alpha-naphthyl ureide from the reaction mixture.

No references cited.